United States Patent
Oudard

(10) Patent No.: US 7,482,060 B2
(45) Date of Patent: Jan. 27, 2009

(54) SILICON OXYCARBIDE COATINGS HAVING DURABLE HYDROPHILIC PROPERTIES

(75) Inventor: Jean-Francois Oudard, Kingsport, TN (US)

(73) Assignee: AGC Flat Glass North America, Inc., Alpharetta, GA (US)

( * ) Notice: Subject to any disclaimer, the term of this patent is extended or adjusted under 35 U.S.C. 154(b) by 169 days.

(21) Appl. No.: 10/890,127

(22) Filed: Jul. 14, 2004

(65) Prior Publication Data

US 2006/0014027 A1    Jan. 19, 2006

(51) Int. Cl.
*B32B 17/06* (2006.01)
*B32B 33/00* (2006.01)
*B05D 3/00* (2006.01)
*C23C 16/00* (2006.01)

(52) U.S. Cl. .................. 428/428; 428/446; 428/213; 428/627; 428/687; 427/248.1; 427/249.1; 427/255.11; 427/585; 427/589; 427/331; 427/344

(58) Field of Classification Search ............... 428/428
See application file for complete search history.

(56) References Cited

U.S. PATENT DOCUMENTS

| | | |
|---|---|---|
| 4,828,880 A | 5/1989 | Jenkins et al. |
| 4,853,251 A | 8/1989 | Ishihara et al. |
| 5,304,394 A | 4/1994 | Sauvinet et al. |
| 5,514,454 A | 5/1996 | Boire et al. |
| 5,530,581 A | 6/1996 | Cogan |
| 5,599,624 A | 2/1997 | Prochazka |
| 5,723,172 A | 3/1998 | Sherman |
| 5,773,086 A | 6/1998 | McCurdy et al. |
| 6,045,896 A | 4/2000 | Boire et al. |
| 6,068,914 A | 5/2000 | Boire et al. |
| 6,103,363 A | 8/2000 | Boire et al. |
| 6,106,892 A | 8/2000 | Ye |
| 6,114,043 A | 9/2000 | Joret |
| 6,299,981 B1 | 10/2001 | Azzopardi et al. |
| 6,326,079 B1 | 12/2001 | Philippe et al. |
| 6,350,397 B1 | 2/2002 | Heikkila et al. |
| 6,444,898 B1 | 9/2002 | Fujisawa et al. |
| 6,503,557 B1 | 1/2003 | Joret |
| 6,660,365 B1 | 12/2003 | Krisko et al. |
| 6,679,978 B2 | 1/2004 | Johnson et al. |
| 6,680,135 B2 | 1/2004 | Boire et al. |
| 2003/0039843 A1 | 2/2003 | Johnson et al. |
| 2003/0162033 A1 | 8/2003 | Johnson et al. |
| 2003/0162035 A1 | 8/2003 | Talpaert |

FOREIGN PATENT DOCUMENTS

| | | |
|---|---|---|
| EP | 0 879 802 B1 | 11/1998 |
| WO | WO 01/32578 A1 | 5/2001 |

*Primary Examiner*—Ling Xu
(74) *Attorney, Agent, or Firm*—Rothwell, Figg, Ernst & Manbeck, P.C.

(57) ABSTRACT

A silicon oxycarbide coating remains hydrophilic for a significantly longer period of time, on the order of several months, when both (i) the coating index of refraction is 1.70 or more and (ii) the coating thickness is 350 Å or more.

21 Claims, 4 Drawing Sheets

SILICON OXYCARBIDE COATINGS HAVING DURABLE HYDROPHILIC PROPERTIES

BACKGROUND OF THE INVENTION

FIELD OF THE INVENTION

The present invention relates to hydrophilic coatings. In particular, the present invention relates to silicon oxycarbide coatings that remain hydrophilic for long periods of time.

DISCUSSION OF THE BACKGROUND

A hydrophilic coating can facilitate the removal of contaminants (e.g., "dirt") from an article by enhancing the ability of water to spread over the surface of the article, and slip between the article and the contaminants, so that the contaminants become separated from the article.

Hydrophilic properties are often associated with coatings of semiconductive materials based on various metal oxides, in particular titanium oxides. Such coatings typically require "activation" by exposure to ultraviolet ("UV") radiation. UV activation enhances the ability of a metal oxide coating to break the chemical bonds joining contaminants to the coating.

UV activation also enhances the hydrophilic properties of metal oxides. The contact angle of water with inorganic materials, such as glass, is generally 20-40 degrees. The contact angle of water with typical organic materials, such as resins, is 70-90 degrees. The contact angle of water with hydrophobic resins, such as silicone resin and fluorocarbon polymers, is more than 90 degrees. In contrast, the contact angle of UV activated metal oxide coatings is less than 20 degrees, and often less than 10 degrees, indicative of the propensity of water to spread out over an activated metal oxide coating. UV irradiation of a metal oxide coating can cause the water contact angle to approach zero.

Hydrophilic properties have also been observed in silicon oxide coatings, silicon oxycarbide coatings and silicon oxynitride coatings. These coatings have been deposited using sol-gel methods and by vapor deposition methods including chemical vapor deposition and sputtering.

WO 01/32578 A1 discloses silicon oxycarbide coatings with enhanced hydrophilic properties. WO 01/32578 A1 discloses that water droplets are not visible on a SiOC coating having an index of refraction of 1.68 and a thickness of 50 nm that has been exposed to a 30° C., 95% relative humidity, laboratory atmosphere for as long as 14 days.

Hydrophilic coatings lose their hydrophilic properties over time. Upon outdoor exposure, conventional silicon oxycarbide coatings typically remain hydrophilic for only about one to two weeks.

To regain hydrophilic properties, coatings must be processed in various ways. Metal oxide coatings must be "reactivated" by exposure to UV radiation to regain their enhanced hydrophilic properties. Silicon-based coatings must be chemically cleaned to restore hydrophilicity. Sunlight can often provide sufficient UV exposure for re-activation. However, exposure to sunlight is not practical in many applications. Chemical cleaning to restore hydrophilicity can often be expensive and time consuming.

Prior studies of hydrophilic coatings have searched for coatings with small water contact angles, but have not focused on increasing the length of time that a hydrophilic coating with a small water contact angle remains hydrophilic.

There is a need for hydrophilic coatings that exhibit enhanced hydrophilic durability and thus require less maintenance to preserve hydrophilic properties.

SUMMARY OF THE INVENTION

The present invention provides a silicon oxycarbide coating that remains hydrophilic even after prolonged outdoor exposure to the elements (i.e., to wind, rain, snow, sun, etc.) for periods of time on the order of several months. The silicon oxycarbide coating of the present invention has both (i) an index of refraction of 1.70 or more and (ii) a thickness of 350 Å or more. The silicon oxycarbide coating does not need to be exposed to UV radiation to become hydrophilic. When the silicon oxycarbide coating loses its hydrophilic properties, these properties can be easily restored by rinsing the coating with a glass cleaner, e.g., a mixture of water with soap or vinegar.

BRIEF DESCRIPTION OF THE DRAWINGS

The preferred embodiments of the present invention will be described in detail, with reference to the following figures, wherein.

DETAILED DESCRIPTION OF PREFERRED EMBODIMENTS

The silicon oxycarbide coating of the present invention exhibits durable hydrophilic properties when exposed to environments containing contaminants, such as the outdoors. The hydrophilic surface of the coating is much easier to clean than standard coated surfaces and remains clean for much longer than standard coated surfaces when exposed to, and washed by, precipitation such as rain.

Figure 1:
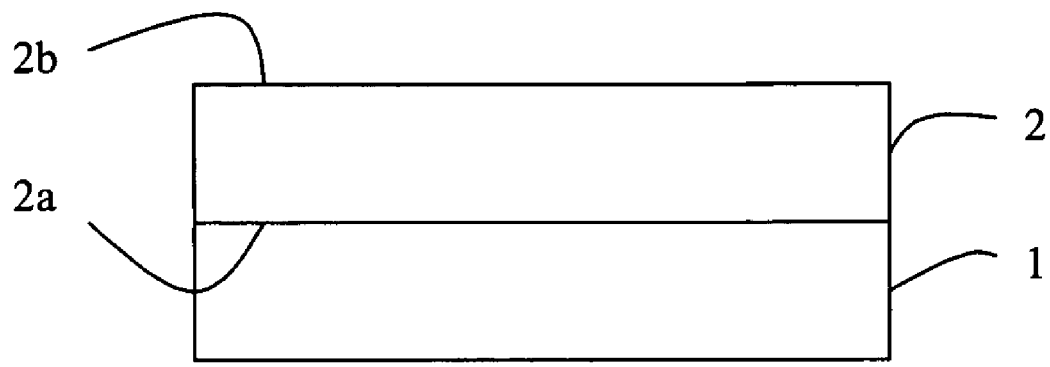
FIG. 1 is a cross-sectional view of a coated article including a substrate and a silicon oxycarbide coating.

FIG. 1 shows an embodiment of the present invention in which a coated article 10 includes a substrate 1 coated with a silicon oxycarbide coating 2. The silicon oxycarbide coating 2 has two opposing surfaces 2a and 2b. The surface 2a is in contact with substrate 1. The surface 2b is in contact with and exposed to air at atmospheric pressure and a temperature of less than 100° C., the boiling point of water. Because the silicon oxycarbide coating 2 is not sandwiched between a solid layer and the substrate 1, the surface 2b of the silicon oxycarbide coating 2 is not in contact with a solid layer.

Figure 2:
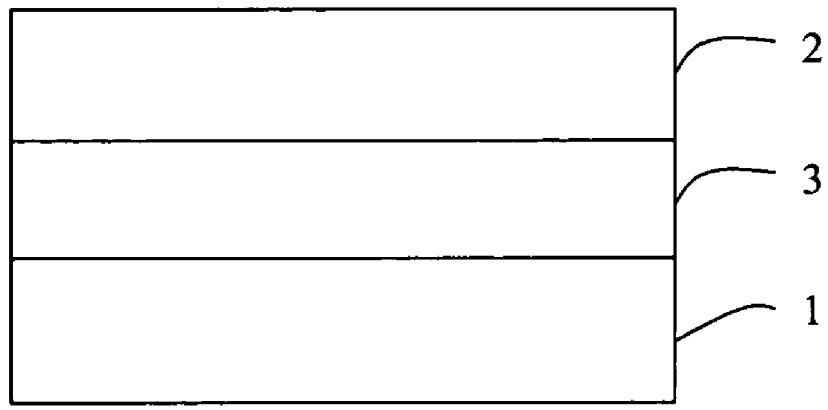
FIG. 2 is a cross-sectional view of a coated article including a substrate, a silicon oxycarbide coating, and an optical stack sandwiched between the substrate and the silicon oxycarbide coating.

FIG. 2 shows an embodiment in which a coated article 20 includes an optical stack 3 sandwiched between a substrate 1 and a silicon oxycarbide coating 2. The optical stack 3 can include one or more layers. The optical stack 3 can be, e.g., a low-emissivity stack including one or more layers of infrared radiation reflective metal (e.g. Ag).

Suitable substrates include materials used in architectural and transportation applications. Such materials include glass, metal, glass-ceramic, ceramic, cement, brick, wood, polymers, etc. Preferably, the substrate comprises a glass. More preferably, the substrate is a glass that is transparent to visible radiation.

The durable hydrophilic coating of the present invention comprises a silicon oxycarbide. Suitable silicon oxycarbides include $Si_xC_y$, where $0<x<1.8$ and $0<y<1.5$. An example of a silicon oxycarbide is SiOC. In embodiments, the silicon oxycarbide contains 0 atomic %<Si≦25 atomic %, 0 atomic %<O≦45 atomic %, and 0 atomic %<C≦40 atomic %. In other embodiments, the silicon oxycarbide contains 0 atomic %<Si≦35 atomic %, 0 atomic %<O<55 atomic %, and 0 atomic %<C≦30 atomic %. In embodiments, in the silicon oxycarbide coating the ratio Si/(C+O) is in a range of from 0.20 to 0.45, more preferably 0.25 to 0.40. In other embodiments, in the silicon oxycarbide coating the ratio Si/(C+O) is in a range of from 0.30 to 0.55, more preferably 0.35 to 0.50.

The hydrophilicity of a silicon oxycarbide coating tends to decrease (i.e., the contact angle of water increases) with increase in index of refraction. In contrast, the durability of the hydrophilicity of a silicon oxycarbide coating increases with increase in index of refraction.

The silicon oxycarbide coatings of the present invention have an index of refraction ("n") of 1.70 or more, such as 1.75 or more, or 1.80 or more. The index of refraction of a silicon oxycarbide coating is a complex function of the relative amounts of, and chemical bonding between, Si, O and C present in the coating. If the index of refraction is less than 1.70, then the durability of the hydrophilic properties of the silicon oxycarbide decreases. For hydrophilic coatings on optical glass, preferably the index of refraction is no more than 2.0, more preferably no more than 1.90, to ensure that the coated optical glass has desirable cosmetic properties. In optical glass applications, if the index of refraction of the silicon oxycarbide coating is greater than 1.90, then the coating tends to produce too much reflection of light, which leads to undesirable cosmetic changes in the coated optical glass.

The silicon oxycarbide coating of the present invention has a thickness in a range of 350 Å or more, preferably 380 Å or more, more preferably 400 Å or more. If the thickness of the coating is less than 350 Å, then the durability of the hydrophilic properties of the silicon oxycarbide decreases.

For a hydrophilic coating on optical glass, preferably the coating is also 800 Å or less thick, more preferably 600 Å or less thick. If the coating is more than 800 Å thick then the coating tends to reflect too much light.

The silicon oxycarbide can be crystalline or amorphous. Preferably, the silicon oxycarbide is amorphous. Preferably the silicon oxycarbide coating is homogenous in composition.

The silicon oxycarbide coating of the present invention can be formed by various processes known in the art, including vapor deposition processes such as sputtering and chemical vapor deposition.

For example, the coating of the present invention can be made by depositing silicon oxycarbide by a chemical vapor deposition process onto a solid substrate. Chemical vapor deposition processes are well known in the art and will not be described in detail here. Silicon oxycarbide can be formed by chemical vapor deposition using gaseous mixtures of silanes, organic compounds, inert carrier gases, and other additive gases. Suitable silanes include monosilane, $SiH_4$; disilane $Si_2H_6$, and halogenated silanes such as dichorosilane $SiH_2Cl_2$. Preferably, the organic compounds are gaseous at room temperature. Such organic compounds include olefinic and acetylenic compounds containing 2 to 5 carbon atoms. Organic compounds containing more than 5 carbon atoms can also be used provided they are gaseous below the decomposition temperature of the silane(s) used. Examples of suitable organic compounds include olefins, e.g., ethylene, butadiene, pentene, and halogenated olefins such as difluoroethylene; acetylenic hydrocarbons, e.g. acetylene; and aromatic hydrocarbons, e.g., benzene, toluene, and xylene. The inert gas (carrier gas) can be, e.g., a noble gas or nitrogen ($N_2$). Other additive gases include ammonia ($NH_3$) and hydrogen ($H_2$).

In embodiments, the silicon oxycarbide coating can be formed by chemical vapor deposition using a mixture of silane, ethylene, carbon dioxide, and nitrogen. The molar concentration for each gas in the reactive atmosphere can be in a range of 5%<silane<20%, 5%<ethylene<20%, 20%<carbon dioxide<80%, and 5%<nitrogen<20%. The maximum and minimum amounts of each gas are driven by the target range for the refractive index.

The silicon oxycarbide coating is preferably deposited in a temperature range of about 400° C. to 800° C., more preferably about 550° C. to 700° C. The deposition rate is preferably in a range of 200 Å/sec to 600 Å/sec.

In embodiments, the silicon oxycarbide coating can be deposited onto float glass formed on a molten tin bath.

The silicon oxycarbide coating of the present invention is hydrophilic. The term "hydrophilic" as used herein means that the contact angle of water with the coating is less than 20 degrees. Preferably, the silicon oxycarbide coating is "superhydrophilic", with a water contact angle of less than 10 degrees, more preferably less than 5 degrees.

Typically, a freshly deposited silicon oxycarbide coating is covered with surface contaminants (carbon, greasy dust, etc.) that prevent the coating from exhibiting hydrophilic behavior. The surface contaminants can collect on the coating when the coating and substrate are cooled following coating deposition.

The freshly deposited silicon oxycarbide coating is made hydrophilic by removing the surface contaminants from the coating. This can be accomplished by rinsing the coating with a glass cleaner and washing away the surface contaminants. Glass cleaners generally include soap and water, or vinegar and water.

Even uncoated glass can become hydrophilic when washed with vinegar. However, the uncoated glass loses its hydrophilic properties within 1 or 2 days, in contrast to the silicon oxycarbide of the present invention with durable hydrophilic properties.

The silicon oxycarbide coating of the present invention exhibits hydrophilic properties of significantly longer duration than a conventional silicon oxycarbide coating having n<1.70 and a thickness<350 Å. The silicon oxycarbide coating of the present invention remains hydrophilic in an environment at least twice as long, preferably at least five times as long, more preferably, at least ten times as long, as a silicon oxycarbide layer having n<1.70 and a thickness<350 Å in the same environment. Under exposure conditions that can cause a conventional silicon oxycarbide coating to lose its hydrophilic properties within 1 to 2 weeks, the silicon oxycarbide coating of the present invention can remain hydrophilic for several months.

Figure 3:
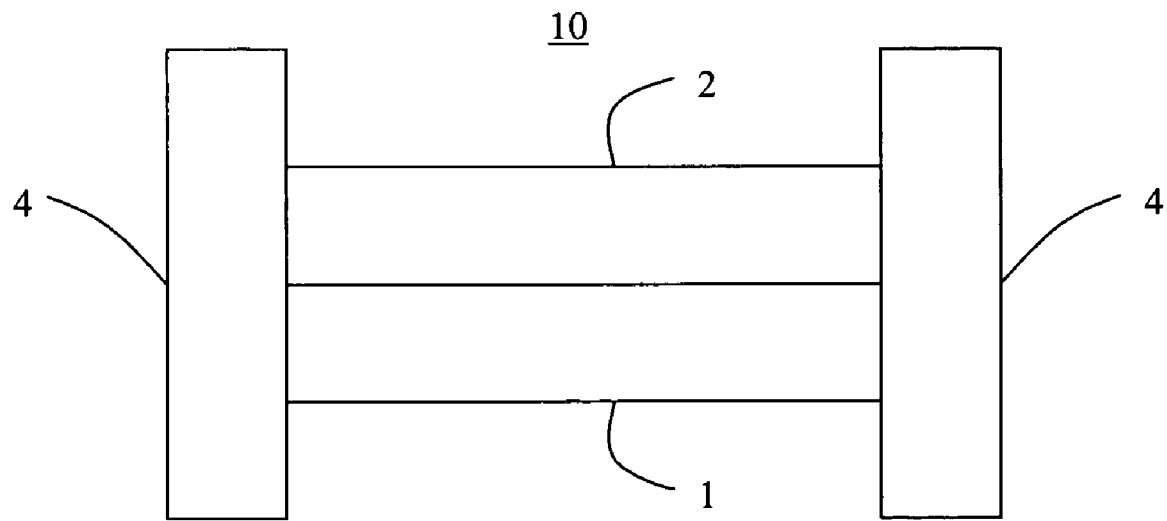
FIG. 3 is a cross-sectional view of a coated article supported in a frame.

FIG. 3 shows an embodiment of the present invention in which a coated article 10, including a substrate 1 coated with a silicon oxycarbide coating 2, is mounted in a frame 4 so that the frame 4 is in contact with the perimeter of the coated article 10. Preferably, the frame 4 is in contact with the entire perimeter of the coated article 10. The frame 4 provides mechanical support to the coated article 10 and silicon oxycarbide coating 2, and allows the coated article 10 to be positioned relative to other objects. For example, in embodiments the frame 4 can serve as a window frame for positioning a coated glass window 10 on an automotive vehicle or a building.

In use, the coated article of the present invention can be placed between an interior region, which is relatively free of contaminants, and an exterior region containing contaminants. Preferably, the coated article is positioned so that the silicon oxycarbide coating faces the exterior region containing contaminants. For example, the coated article can be positioned to separate the interior of a vehicle or building from the outdoors, with the silicon oxycarbide coating facing the contaminated environment of the outdoors. The hydrophilic properties of the silicon oxycarbide coating facilitate the removal by rinsing with water of any contaminants that accumulate on the coated surface of the article.

Although the silicon oxycarbide coating of the present invention retains its hydrophilic properties significantly longer than conventional hydrophilic coatings, eventually the hydrophilic properties of the coating begin to degrade. When this occurs, the hydrophilic properties can be restored by rinsing the silicon oxycarbide coating again with a glass cleaner, such as soap and water, or vinegar and water.

The invention having been generally described, reference is now made to the following examples, which are provided for purposes of illustration only, and are not intended to be limiting unless otherwise specified.

EXAMPLES

Examples 1-3

Silicon oxycarbide coatings with n>1.70 and thickness>350 Å were deposited by chemical vapor deposition onto ribbons of hot soda lime glass produced by a float glass process under non-oxidizing conditions. The coatings were deposited from a reactive gas mixture containing about 8.8 weight % silane, 9.8 weight % ethylene, 73.9 weight % carbon dioxide and 7.4 weight % nitrogen blown across the glass ribbon at a temperature of 680° C. and at a pressure slightly above the float bath pressure.

Comparative coatings with n<1.70 and thickness<350 Å were also deposited under the same conditions on identical substrates.

The coatings were rinsed using a glass cleaner of water and vinegar.

The composition of each of the coatings was determined by x-ray photoelectron spectroscopy (ESCA). The index of refraction and thickness of each of the coatings was determined by spectrophotometry.

The coatings were exposed to the outdoors side-by-side in a horizontal position.

The hydrophilic properties were estimated by observing how sprayed water on each coating surface sheeted away in comparison with the water sheeting from a standard piece of clear float glass.

The hydrophilic properties of silicon oxycarbide coatings are shown in Table 1.

TABLE 1

| Example | Index of refraction (n) | Coating thickness (Å) | Duration of hydrophilic properties* (days) |
|---|---|---|---|
| 1 | 1.75 | 550 | >200 |
| 2 | 1.60 | 350 | 10 to 20 |
| 3 | 1.58 | 300 | 2 to 10 |

On the first day of exposure, Examples 1, 2 and 3 exhibited the same behavior of sheeting away water while the standard piece of clear float glass did not. However, after 2 to 10 days Example 3 no longer sheeted away water and instead behaved like the standard piece of clear float glass. After 10 to 20 days, Example 2 no longer sheeted away water and instead behaved like the standard piece of clear float glass. Example 1 continued to sheet away water even after 200 days.

The duration of hydrophilic properties in Examples 2 and 3 varied within the range shown in Table 1 depending upon the outdoor exposure conditions (e.g., rain, sun, temperature).

Table 1 shows that a silicon oxycarbide coating exhibits hydrophilic properties for a significantly longer period of time when the silicon oxycarbide coating has an index of refraction of 1.70 or more and a thickness of 350 Å or more.

Example 4

Figure 4:
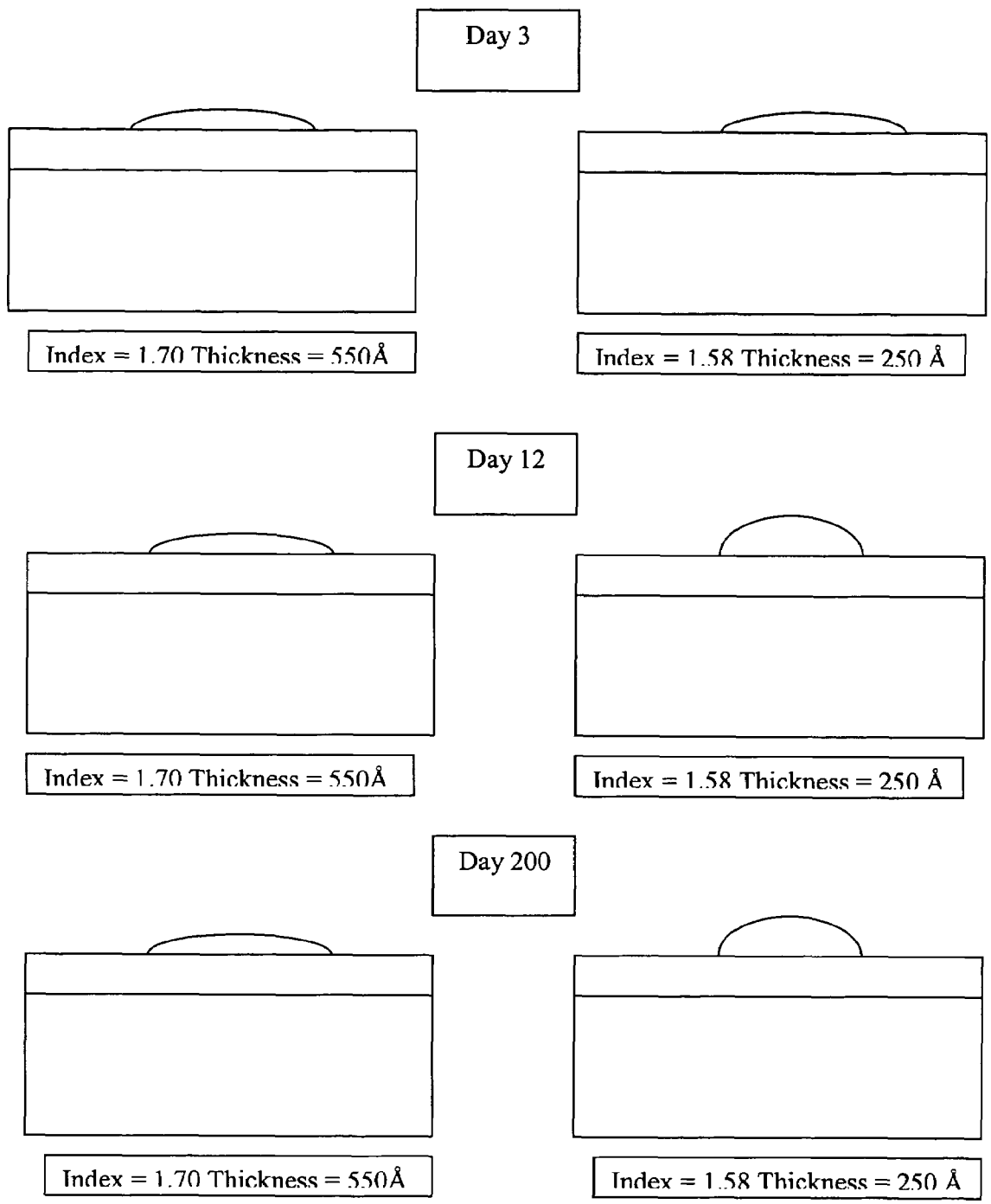
FIG. 4 compares schematically the water contact angle of a silicon oxycarbide coating having a refractive index of 1.70 and a thickness of 550 Å with the water contact angle of a silicon oxycarbide coating having a refractive index of 1.58 and a thickness of 250 Å after exposure outdoors for 3 days, 12 days and 200 days.

FIG. 4 schematically represents water droplets on a silicon oxycarbide coating, which has a refractive index of 1.70 and a thickness of 550 Å, after the coating has been exposed to the outdoors for 3 day, 12 days and 200 days. FIG. 4 also schematically represents water droplets on a comparative silicon oxycarbide coating, which has a refractive index of 1.58 and a thickness of 250 Å, after the comparative coating has been exposed to the outdoors for 3 days, 12 days and 200 days under the same conditions.

FIG. 4 shows that after 3 days both silicon oxycarbide coatings are hydrophilic. However, after 12 days, while the silicon oxycarbide coating having a refractive index of 1.70 and a thickness of 550 Å remains hydrophilic, the comparative silicon oxycarbide coating has lost its hydrophilic properties. After 200 days, the silicon oxycarbide coating of the present invention continues to exhibit hydrophilic properties.

The disclosure herein of a numerical range of values is a disclosure of every numerical value within that range.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A coating having opposing first and second surfaces, where the first surface is in contact with either a solid substrate or an optional optical stack between the coating and the solid substrate, and the second surface is in contact with essentially only air at atmospheric pressure and a temperature of less than 100° C., wherein
   the coating has
      a homogeneous composition comprising a silicon oxycarbide,
      an index of refraction of 1.70 or more, and a thickness of 350 Å or more; and
   the second surface of the coating is hydrophilic with a contact angle with water of less than 20 degrees.

2. The coating according to claim 1, wherein the silicon oxycarbide comprises
   35 atomic % or less Si, but more than 0 atomic % Si;
   55 atomic % or less 0, but more than 0 atomic % 0; and
   30 atomic % or less C, but more than 0 atomic % C.

3. The coating according to claim 1, wherein the silicon oxycarbide comprises SiOC.

4. The coating according to claim 1, wherein the index of refraction is in a range of 1.70 to 2.0.

5. The coating according to claim 1, wherein the thickness is in a range of 350 Å to 800Å.

6. The coating according to claim 1, wherein the coating was produced by a chemical vapor deposition process.

7. The coating according to claim 6, wherein the chemical vapor deposition process comprised exposing the solid substrate at a temperature in a range of from 400° C. to 800° C. to an atmosphere containing silane, ethylene, carbon dioxide and nitrogen.

8. The coating according to claim 1, wherein the first surface of the coating is in contact with a solid substrate comprising a glass.

9. The coating according to claim 8, wherein the first surface of the coating is in contact with an optical stack between the coating and the glass.

10. The coating according to claim 1, wherein the second surface of the coating is hydrophilic with a contact angle with water of less than 10 degrees.

11. The coating according to claim 1, wherein the second surface of the coating is hydrophilic with a contact angle with water of less than 5 degrees.

12. The coating according to claim 1, wherein the index of refraction is greater than 1.80.

13. A method of making a coating, the method comprising
    depositing on a solid substrate by a chemical vapor deposition process a silicon oxycarbide composition; and
    producing the coating of claim 1.

14. The method according to claim 13, wherein the chemical vapor deposition process comprises exposing the solid substrate at a temperature in a range of from 400° C. to 800° C. to an atmosphere containing silane, ethylene, carbon dioxide and nitrogen.

15. A method of using a coating, the method comprising supporting the coating of claim 1 in a window frame.

16. A method of using a coating, the method comprising placing the coating of claim 1 between an interior region and an exterior region containing contaminants.

17. A method of using a coating to keep a substrate free of contamination, the method comprising
    exposing the coating of claim 1 to the outdoors; and
    washing the second surface of the coating with a glass cleaner.

18. The method according to claim 17, wherein the glass cleaner comprises water and at least one member of the group consisting of soap and vinegar.

19. The method according to claim 17, wherein after the washing the second surface of the coating remains hydrophilic, with a contact angle with water of less than 20 degrees, in an environment longer than a silicon oxycarbide layer having an index of refraction of less than 1.70 and a thickness of less than 350 Å in the same environment.

20. The method according to claim 19, wherein after the washing the second surface of the coating remains hydrophilic, with a contact angle with water of less than 20 degrees, in an environment at least twice as long as the silicon oxycarbide layer having an index of refraction of less than 1.70 and a thickness of less than 350 Å in the same environment.

21. The method according to claim 19, wherein after the washing the second surface of the coating remains hydrophilic, with a contact angle with water of less than 20 degrees, in an environment at least five times as long as the silicon oxycarbide layer having an index of refraction of less than 1.70 and a thickness of less than 350 Å in the same environment.

* * * * *